May 4, 1926.  1,583,292
E. F. HEARD ET AL
TOOL SETTING GAUGE FOR LATHES AND THE LIKE
Filed Nov. 11, 1924
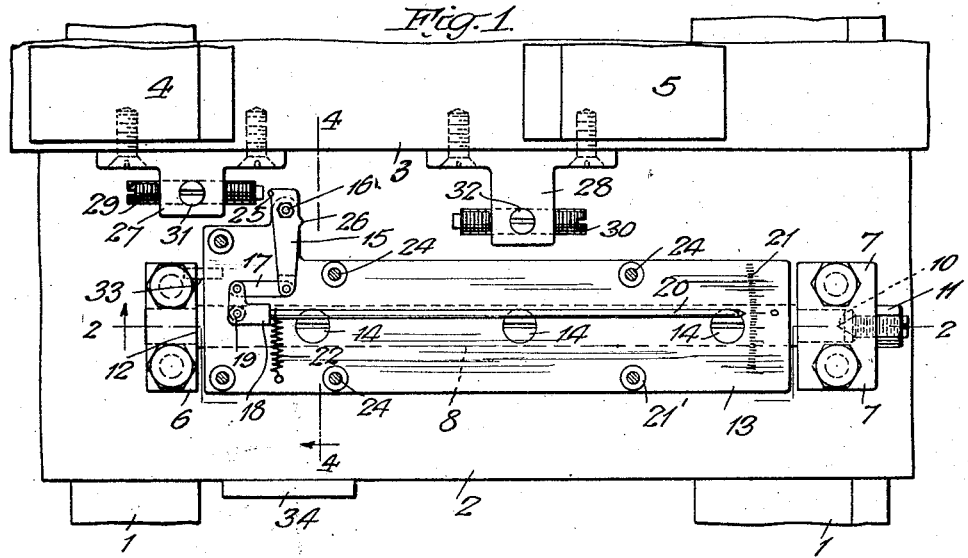
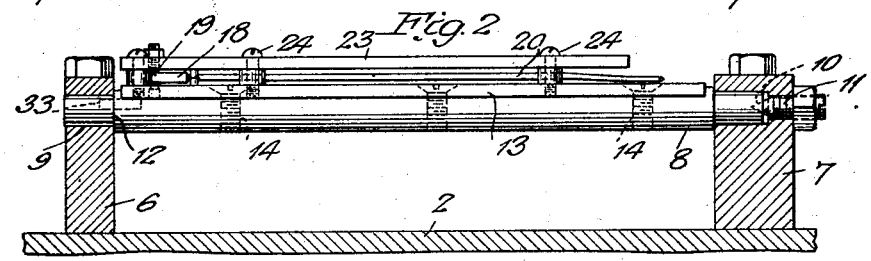
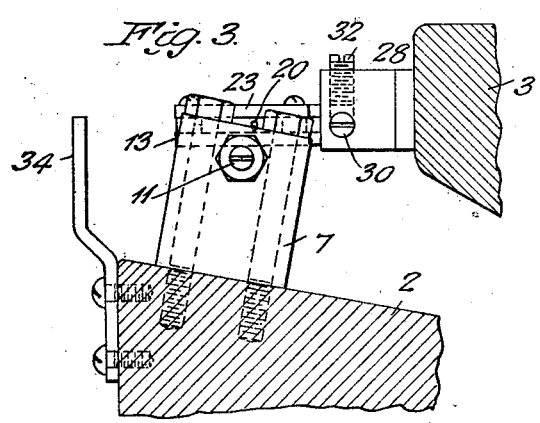
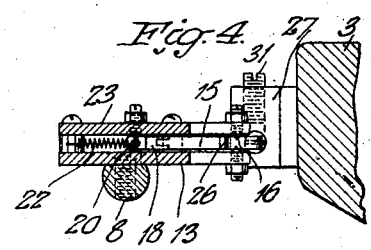
INVENTORS
EDMUND F. HEARD.
MAYO M. FITZHUGH
BY Sheffield & Betts
THEIR ATTORNEYS Patented May 4, 1926.

1,583,292

UNITED STATES PATENT OFFICE.

EDMUND F. HEARD, OF ELIZABETH CITY COUNTY, AND MAYO M. FITZHUGH, OF NEWPORT NEWS, VIRGINIA, ASSIGNORS TO NEWPORT NEWS SHIPBUILDING & DRY DOCK COMPANY, OF NEWPORT NEWS, VIRGINIA, A VIRGINIA CORPORATION.

TOOL-SETTING GAUGE FOR LATHES AND THE LIKE.

Application filed November 11, 1924. Serial No. 749,183.

*To all whom it may concern:*

Be it known that we, EDMUND F. HEARD and MAYO M. FITZHUGH, citizens of the United States, residing, respectively, in the county of Elizabeth City, State of Virginia, and city of Newport News, county of Warwick, State of Virginia, have invented certain new and useful Improvements in Tool-Setting Gauges for Lathes and the like, of which the following is a full, clear, and complete description.

Our invention relates to tool setting gauges for lathes and the like, whereby the tools may be set to duplicate the work in a simple, reliable and efficient manner. In our copending application, Serial No. 749,854 filed November 14, 1924, we have filed double gang tool holders on a slidable carriage movable at right angles to the lathe center, the carriage being provided with a stop adapted to strike adjustable screws positioned on opposite sides of said stop to a fixed element of the lathe, and the screws were adjusted to the proper position for duplicating the work. When the movement of the tool holders is limited in this manner, considerable difficulty is experienced in duplicating sizes of the work due to the inability of different operators to exert the same effort on the cross-feed screw which moves the carriage, or the same operator exerting the same effort at different times, resulting in more or less inaccurate work.

The present invention has for its object the provision of means for positively determining when the desired definite relation of position has been duplicated, after having first been determined, between the work axis or a point on the work axis, and a cutting tool of an engine lathe, boring mill or other metal turning machine operating on the lathe principle.

Our invention will be better understood from the following description taken in connection with the accompanying drawings, and its scope will be pointed out in the appended claims.

In the drawings illustrating our invention:

Fig. 1 is a top plane view showing a part of a double tool lathe having our invention thereon, Fig. 2 is a vertical section taken on the line 2—2 of Fig. 1, Fig. 3 is an end view of Fig. 1 and Fig. 4 is a section taken on the line 4—4 of Fig. 1.

Referring to the drawings in which the numeral 1 indicates a lathe bed for a carriage 2, movable parallel to the lathe centers, having a tool slide 3, movable at right angles to the travel of the carriage, that is, toward and from the lathe centers, in any suitable manner, such as by a cross-feed screw not shown in the drawings, which slide 3 carries tool holders or blocks 4, 5, positioned on opposite sides of the lathe centers. For a more detailed description of the lathe per se, reference may be had to our copending application referred to above, although the description set forth will suffice for our present invention.

The carriage 2 is provided with blocks or brackets 6, 7 for supporting a shaft 8 parallel with slide 3. One end of said shaft is journaled in a bearing 9 in block 6, and its opposite end is formed with a seat 10 adapted to receive a screw 11 having a conical point. By means of screw 11, shaft 8 may be adjusted until its shoulders 12 abut block 6, thereby eliminating longitudinal lost motion. Lost motion at right angles to the axis of shaft 8 at its end adjacent block 7 is eliminated by the conical point of screw 11. While shaft 8 may rotate about its axis, it may be accurately adjusted to eliminate lost motion.

A base or plate 13 is suitably fixed to the shaft 8 such as by screws 14. A lever 15 is pivoted on said plate 13 at 16, and is connected at one end by a link 17 to a bell crank 18 which is pivoted to the plate 13 at 19. The bell crank 18 carries a pointer 20, adapted to cooperate with a scale 21, on the plate 13, having its zero point as indicated. The pointer 20 is normally urged against a stop 21' by a spring 22. A protective cover 23 for the mechanism described may be secured to plate 13 by screws 24. In this case one of the screws 24 may serve as the stop 21. The lever 15 is provided with stops 25, 26 on opposite sides from its pivot 16 and equidistantly therefrom as shown. The tool slide 3 carries brackets 27, 28 having respectively screws 29, 30 parallel to itself. These screws may be respectively provided with locking screws 31, 32. The block 6 carries a pin 33 on which the plate 13 rests in position for the stops 25, 26, of lever 15 to be engaged respectively by screws 29 and 30 as tool slide 3 moves back and forth.

In view of the foregoing detailed description, the operation of our invention will be readily understood from a brief description thereof. When tool slide 3 has been moved to the left as viewed in Fig. 1 until tool holder 5 with its cutting tools is in proper relation to the work being turned, and which it is desired to duplicate, the screw 30, which now engages stop 26, is turned until the pointer 20 rests on the zero point, after which the screw 30 is locked by screw 32. With respect to tool holder 4, the same procedure is followed by turning screw 29, which engages stop 25, and locking same by screw 31. If it is desired to advance the tool slide 3 beyond the limits allowed by said indicator gauge, the unit may be rotated about its axis 8 away from the tool slide 3, until it bears against a rest 34, on the carriage 2, provided for this purpose.

From a consideration of the above description, taken in connection with the drawings, our invention will be apparent without further explanation, and the advantages set forth prior to the detailed description will be readily recognized. We do not wish to be understood as being limited to the details of form or arrangement of parts that may be made by those skilled in the art without departing from the spirit and scope of our invention.

What we claim and desire to secure by United States Letters Patent is:

1. In a lathe having a carriage, a tool slide, a plurality of cutting tools carried thereon, a device of the character described comprising an indicator associated therewith on said carriage for indicating the cutting positions of said tools, and means carried by said tool slide comprising adjustable contacting members adapted to operate said indicator when said tools have attained the limits corresponding to their respective final cutting positions on the work being machined.

2. In a lathe having a carriage and a tool slide, a device of the character described comprising an indicator on said carriage for indicating the position of a plurality of tools normally urged in one direction and adjustable means carried by said tool slide adapted to actuate said indicating means comprising stops contacting with elements joined to said indicator to show the positions of the tools.

3. A lathe comprising a carriage, a tool-slide thereon carrying a plurality of tool holders, a pointer on said carriage, stops on said slide, an adjustable member on the carriage for contacting with a stop for moving the pointer and a second adjustable member on the carriage for contacting with another stop to move said pointer whereby the positions of the tools may be determined.

4. In a lathe having a carriage and a tool slide thereon, a device of the character described comprising a base, means rotatably supporting said base on said carriage, a pivoted element on said base, a pointer pivoted on said base connected with said element, resilient means urging said pointer in one direction, and adjustable stops carried by said tool slide, adapted to engage said element and thereby move said pointer in the opposite direction.

5. In a lathe having a carriage and a tool slide thereon, a device of the character described comprising a base, means rotatably supporting said base on said carriage parallel with said tool slide, a pivoted element on said base, a pointer pivoted on said base connected with said element, resilient means urging said pointer in one direction, and adjustable stops carried by said tool slide adapted to engage said element and thereby move said pointer in the opposite direction.

6. In a lathe having a carriage and a tool slide thereon, a device of the character described comprising a base, means rotatably supporting said base on said carriage, adjustable means for preventing lost motion of said base on its supporting means, a pivoted element on said base, a pointer pivoted on said base connected with said element, resilient means urging said pointer in one direction, and adjustable stops carried by said tool slide adapted to engage said element and thereby move said pointer in the opposite direction.

7. In a lathe having a carriage and a tool slide thereon, a device of the character described comprising a base, means rotatably supporting said base on said carriage, a pivoted element on said base, a pointer pivoted on said base connected with said element, resilient means urging said pointer in one direction, and adjustable stops carried by said tool slide positioned on opposite sides of said element adapted to engage said element and thereby move said pointer in the opposite direction.

8. In a lathe having a carriage and a tool slide thereon, a device of the character described comprising a base plate, adjustable means rotatably supporting said plate on said slide, an indicating scale on said plate, a pointer pivoted on said plate adapted to move over said scale, means normally urging said pointer in one direction, adjustable stops carried by said tool slide, an element pivoted on said plate positioned intermediate said stops and adapted to be engaged by said stops, and means connecting said element and said pointer whereby said pointer is moved over said scale when said element is engaged by either of said stops.

9. In a lathe having a carriage and a tool slide thereon, a device of the character described comprising a shaft, means rotatably supporting said shaft on said carriage, adjustable means for preventing lost motion of said shaft in its supporting means, a base plate fixed on said shaft having an indicating scale thereon, a pointer pivoted on said plate adapted to move over said scale, means normally urging said pointer in one direction, adjustable stops carried by said tool slide, an element pivoted on said plate positioned intermediate said stops and adapted to be engaged by said stops, and means connecting said element and said pointer whereby said pointer is moved over said scale when said element is engaged by either of said stops.

Signed this 6th day of November, 1924.

EDMUND F. HEARD.
MAYO M. FITZHUGH.